US012628106B2

(12) United States Patent
Golebiowski et al.

(10) Patent No.: US 12,628,106 B2
(45) Date of Patent: May 12, 2026

(54) TIMING ERROR HANDLING IN TELECOMMUNICATION SYSTEMS

(71) Applicant: Nokia Technologies Oy, Espoo (FI)

(72) Inventors: Bartlomiej Golebiowski, Wroclaw (PL); Man Hung Ng, Swindon (GB); Toni Harri Henrikki Lähteensuo, Espoo (FI)

(73) Assignee: Nokia Technologies Oy, Espoo (FI)

( * ) Notice: Subject to any disclaimer, the term of this patent is extended or adjusted under 35 U.S.C. 154(b) by 332 days.

(21) Appl. No.: 18/684,162

(22) PCT Filed: Oct. 14, 2022

(86) PCT No.: PCT/EP2022/078694
§ 371 (c)(1),
(2) Date: Feb. 15, 2024

(87) PCT Pub. No.: WO2023/066809
PCT Pub. Date: Apr. 27, 2023

(65) Prior Publication Data
US 2024/0224213 A1 Jul. 4, 2024

(30) Foreign Application Priority Data
Oct. 22, 2021 (FI) ..................................... 20216104

(51) Int. Cl.
*H04W 56/00* (2009.01)
(52) U.S. Cl.
CPC ... *H04W 56/0055* (2013.01); *H04W 56/0045* (2013.01)

(58) Field of Classification Search
None
See application file for complete search history.

(56) References Cited

U.S. PATENT DOCUMENTS

2013/0107793 A1 5/2013 Gan et al.
2019/0268817 A1* 8/2019 Seo ........................ H04W 84/04
(Continued)

FOREIGN PATENT DOCUMENTS

EP 3849265 A1 7/2021
JP 2011114422 A 6/2011
(Continued)

OTHER PUBLICATIONS

"3rd Generation Partnership Project; Technical Specification Group Radio Access Network; NR; Integrated Access and Backhaul (IAB) conformance testing; Part 2: Radiated conformance testing; (Release 16)", 3GPP TS 38.176-2, V16.1.0, Sep. 2021, pp. 1-319.
(Continued)

*Primary Examiner* — Suhail Khan
(74) *Attorney, Agent, or Firm* — Nokia Technologies Oy

(57) ABSTRACT

The present subject matter relates to a method for operating a node of a communication system. The node is configured to support wireless backhauling in the communication system and support wireless access in the communication system. The method comprises: receiving from a node first data on a backhaul link and second data on an access link, determining transmit times of the first and second data using the received first data and second data, determining a timing error using the determined transmit times.

20 Claims, 7 Drawing Sheets

(56) References Cited

U.S. PATENT DOCUMENTS

| | | | |
|---|---|---|---|
| 2020/0059879 A1 | 2/2020 | Nam et al. | |
| 2020/0337000 A1* | 10/2020 | Kim ................... | H04L 43/0864 |
| 2021/0195541 A1 | 6/2021 | Wei et al. | |
| 2021/0298000 A1 | 9/2021 | Park et al. | |

FOREIGN PATENT DOCUMENTS

| | | |
|---|---|---|
| WO | 2019/208994 A1 | 10/2019 |
| WO | 2020/196849 A1 | 10/2020 |
| WO | 2021/040596 A1 | 3/2021 |
| WO | 2021/206618 A1 | 10/2021 |
| WO | 2022/207342 A1 | 10/2022 |

OTHER PUBLICATIONS

"New WID on Enhancements to Integrated Access and Backhaul", 3GPP TSG RAN Meeting #88e, RP-201293, Agenda: 9.10.10, Qualcomm, Jun. 29-Jul. 3, 2020, 5 pages.

"WF on RF impact for Rel-17 eIAB", 3GPP TSG-RAN WG4 Meeting #100-e, R4-2115645, Agenda: 9.17.2, Samsung, Aug. 16-27, 2021, 2 pages.

"3rd Generation Partnership Project; Technical Specification Group Radio Access Network; NR; Requirements for support of radio resource management (Release 17)", 3GPP TS 38.133, V17.3.0, Sep. 2021, 3206 pages.

"3rd Generation Partnership Project; Technical Specification Group Radio Access Network; NR; Base Station (BS) radio transmission and reception (Release 17)", 3GPP TS 38.104, V17.3.0, Sep. 2021, pp. 1-319.

"3rd Generation Partnership Project; Technical Specification Group Radio Access Network; NR; User Equipment (UE) radio transmission and reception; Part 1: Range 1 Standalone (Release 17)", 3GPP TS 38.101-1, V17.2.0, Jun. 2021, pp. 1-536.

"3rd Generation Partnership Project; Technical Specification Group Radio Access Network; NR; User Equipment (UE) radio transmission and reception; Part 2: Range 2 Standalone (Release 17)", 3GPP TS 38.101-2, V17.3.0, Sep. 2021, pp. 1-187.

"3rd Generation Partnership Project; Technical Specification Group Radio Access Network; NR; Physical channels and modulation (Release 16)", 3GPP TS 38.211, V16.7.0, Sep. 2021, pp. 1-134.

Bishnu et al., "Performance Evaluation of Full-Duplex IAB Multi-Cell and Multi-User Network for FR2 Band", IEEE Access, vol. 9, May 14, 2021, pp. 72269-72283.

Office action received for corresponding Finnish Patent Application No. 20216104, dated May 6, 2022, 9 pages.

"3rd Generation Partnership Project; Technical Specification Group Radio Access Network; NR; Integrated access and backhaul radio transmission and reception (Release 16)", 3GPP TS 38.174, V16.4.0, Sep. 2021, pp. 1-315.

"3rd Generation Partnership Project; Technical Specification Group Radio Access Network; NR; Integrated access and backhaul (IAB) conformance testing Part 1: Conducted conformance testing (Release 16)", 3GPP TS 38.176-1, V16.1.0, Sep. 2021, pp. 1-215.

"3rd Generation Partnership Project; Technical Specification Group Radio Access Network; NR; Study on Integrated Access and Backhaul; (Release 16)", 3GPP TR 38.874, V16.0.0, Dec. 2018, pp. 1-111.

International Search Report and Written Opinion received for corresponding Patent Cooperation Treaty Application No. PCT/EP2022/078694, dated Feb. 7, 2023, 12 pages.

"On NR IAB general demodulation requirements", 3GPP TSG-RAN WG4 Meeting #96-e, R4-2011399, Agenda: 7.4.5.1, Nokia, Aug. 17-28, 2020, 14 pages.

* cited by examiner

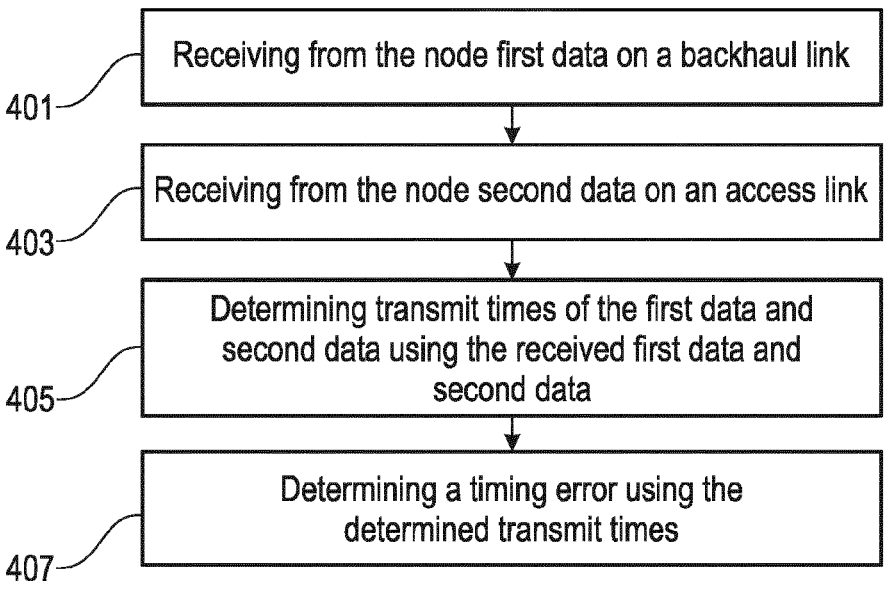

401 — Receiving from the node first data on a backhaul link

403 — Receiving from the node second data on an access link

405 — Determining transmit times of the first data and second data using the received first data and second data 407 — Determining a timing error using the determined transmit times

Fig. 4

501 — Receiving from the node first data on a backhaul link

503 — Receiving from the node second data on an access link

505 — Determining transmit times of the first data and second data using the received first data and second data 506 — Determining a time shift 507 — Determining a timing error using the determined transmit times and the time shift

Fig. 5

701 — Receiving from the node first data on a backhaul link using PUSCH Type A

703 — Receiving from the node second data on an access link using PDSCH Type B

705 — Determining transmit times of the first data and second data using the received first data and second data 706 — Determining a time shift 707 — Determining a timing error using the determined transmit times and the time shift

801

| Parameter | Value |
|---|---|
| Mapping type | PDSCH mapping type A or type B |
| dmrs-TypeA-Position or dmrs-TypeB-Position for the first DM-RS symbol | pos2 [for type A] pos0 [for type B] |
| dmrs-AdditionalPosition for additional DM-RS symbol(s) | pos0 |
| dmrs-Type for comb pattern | Configuration type 1 |
| maxLength | 1 |
| Ratio of PUSCH EPRE to DM-RS EPRE | 0 dB |

| Parameter | Value |
|---|---|
| Mapping type | PUSCH mapping type A or type B |
| dmrs-TypeA-Position or dmrs-TypeB-Position for the first DM-RS symbol | pos2 [for type A] pos0 [for type B] |
| dmrs-AdditionalPosition for additional DM-RS symbol(s) | 'pos0' |
| dmrs-Type for comb pattern | Configuration type 1 |
| maxLength | 1 |
| Ratio of PUSCH EPRE to DM-RS EPRE | 0 dB |
| PTRS configuration and density | $L_{PT-RS}= 4$ $K_{PT-RS}= 2$ $k_{ref}^{RE} = 00$ |
| Ratio of PT-RS EPRE to DM-RS EPRE | 0 dB |

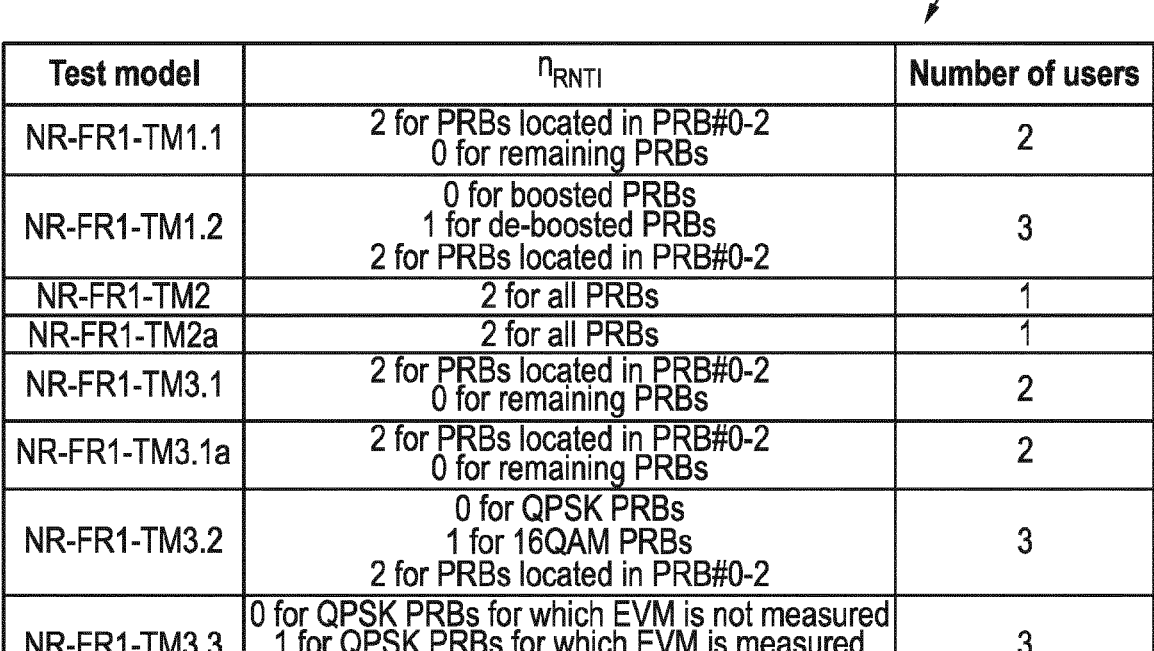

| Test model | $n_{RNTI}$ | Number of users |
|---|---|---|
| NR-FR1-TM1.1 | 2 for PRBs located in PRB#0-2<br>0 for remaining PRBs | 2 |
| NR-FR1-TM1.2 | 0 for boosted PRBs<br>1 for de-boosted PRBs<br>2 for PRBs located in PRB#0-2 | 3 |
| NR-FR1-TM2 | 2 for all PRBs | 1 |
| NR-FR1-TM2a | 2 for all PRBs | 1 |
| NR-FR1-TM3.1 | 2 for PRBs located in PRB#0-2<br>0 for remaining PRBs | 2 |
| NR-FR1-TM3.1a | 2 for PRBs located in PRB#0-2<br>0 for remaining PRBs | 2 |
| NR-FR1-TM3.2 | 0 for QPSK PRBs<br>1 for 16QAM PRBs<br>2 for PRBs located in PRB#0-2 | 3 |
| NR-FR1-TM3.3 | 0 for QPSK PRBs for which EVM is not measured<br>1 for QPSK PRBs for which EVM is measured<br>2 for PRBs located in PRB#0-2 | 3 |

Fig. 8C

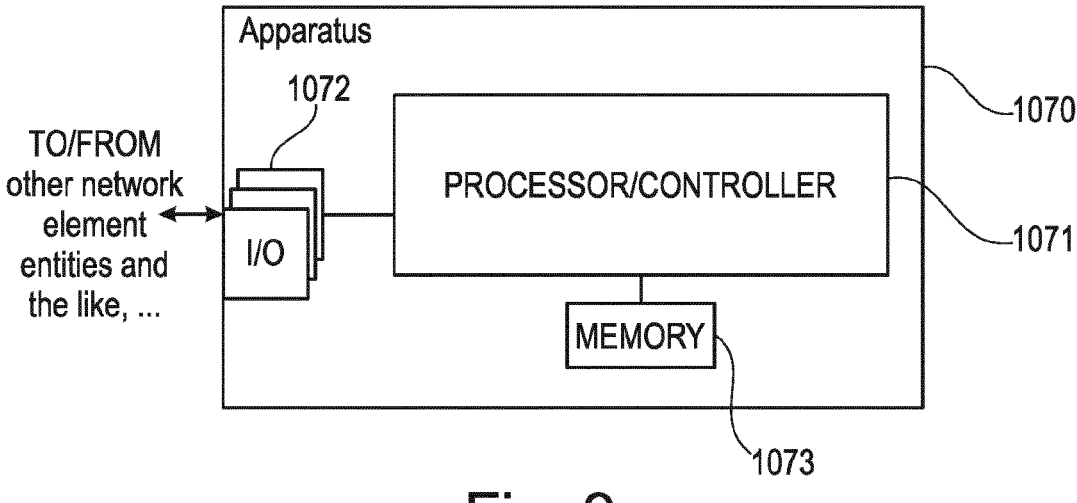

Fig. 9

TIMING ERROR HANDLING IN TELECOMMUNICATION SYSTEMS

RELATED APPLICATION

This application was originally filed as PCT Application No. PCT/EP2022/078694, filed on Oct. 14, 2022, which claims priority from FI application No. 20216104, filed Oct. 22, 2021, each of which is incorporated herein by reference in its entirety.

TECHNICAL FIELD

Various example embodiments relate to telecommunication systems, and more particularly to a method for operating a node.

BACKGROUND 5G refers to a new generation of radio systems and network architecture. 5G is expected to provide higher bitrates and coverage than the current long-term evolution (LTE) systems. Integrated access and backhaul (IAB) is one of the key work items for 5G. However, there is a need to improve the operation of IAB nodes.

SUMMARY

Example embodiments provide a method for operating a node of a communication system, the node being configured to support wireless backhauling in the communication system and support wireless access in the communication system, the method comprising: receiving from the node first data on a backhaul link; receiving from the node second data on an access link; determining transmit times of the first data and second data using the received first data and second data; determining a timing error using the determined transmit times.

Example embodiments provide a method for operating a node of a communication system, the node being configured to support wireless backhauling in the communication system and support wireless access to user equipments in the communication system, the method comprising: receiving from the node first data on a backhaul link; receiving from the node second data on an access link; determining transmit times of the first data and second data using the received first data and second data; determining a timing error using the determined transmit times.

Example embodiments provide a method for operating an IAB node, the method comprising: receiving from the IAB node first data on a backhaul link; receiving from the IAB node second data on an access link; determining transmit times of the first data and second data using the received first data and second data; determining a timing error using the determined transmit times.

Example embodiments provide a computer program comprising instructions for causing an apparatus for performing at least the following: receiving from a node first data on a backhaul link and second data on an access link; determining transmit times of the first and second data using the received first data and second data; determining a timing error using the determined transmit times.

Example embodiments provide an apparatus comprising means being configured for: receiving from a node first data on a backhaul link and second data on an access link; determining transmit times of the first and second data using the received first data and second data; determining a timing error using the determined transmit times.

According to an example, the first data comprises a first reference signal and the second data comprises a second reference signal. The first data may be transmitted in a first time slot and the second data may be transmitted in a second time slot. The first reference signal may be transmitted on a first time unit of the first time slot and the second reference signal may be transmitted on a second time unit of the second time slot. This may provide a pair of time slots to be processed, namely the first time slot and second time slot. The processing of the pair of time slots may enable to determine the transmit times of the first data and second data, wherein determining the transmit times comprises: determining a time shift between the first time unit and the second time unit, and shifting the transmit time of the first data or of the second data using the time shift resulting in one shifted transmit time of one data and one unshifted transmit time of the other data, wherein the timing error is determined using the shifted transmit time and the unshifted transmit time. If for example, the first time unit and the second time unit do not have the same position within the time slot (e.g., the first time unit is the first symbol and the second time unit is the third symbol), the time shift between the first time unit and the second time unit may include this time difference between the two positions. If in addition, the slot number of the first time slot and the second time slot is not the same, the time shift between the first time unit and the second time unit may additionally include a time shift that represents the difference in slot numbers of the first time slot and the second time slot. Thus, the method may, for example, comprise determining the time shift and using the time shift for the timing error determination, in response to checking and thus determining that the positions of the first and second reference signals are different and/or the slots numbers of the first and second time slots are different. If for example, the first data and second data is transmitted on multiple time slots respectively, the method described with this example may be repeated for each pair of corresponding time slots of the first data and second data. This may result in individual time shifts which may be averaged to obtain the overall time shift between the first data and second data.

Note that the words "first" and "second" are used here and elsewhere for labelling purposes only and are not intended to denote any specific spatial or temporal ordering.

BRIEF DESCRIPTION OF THE DRAWINGS

The accompanying figures are included to provide a further understanding of examples, and are incorporated in and constitute part of this specification. In the figures:

FIG. 4 is a flowchart of a method for operating a node according to an example of the present subject matter;

FIG. 5 is a flowchart of a method for operating a node according to an example of the present subject matter;

FIG. 8A is a table indicating mapping type A for PDSCH for IAB-DU according to an example of the present subject matter;

FIG. 8B is a table indicating mapping types A and B for PUSCH for IAB-MT according to an example of the present subject matter;

FIG. 8C is a table indicating PUSCH PRBs mapping of users for FR1 test models (frequency range 1) according to an example of the present subject matter;

FIG. 9 is a block diagram showing an example of an apparatus according to an example of the present subject matter.

DETAILED DESCRIPTION

Figure 1:
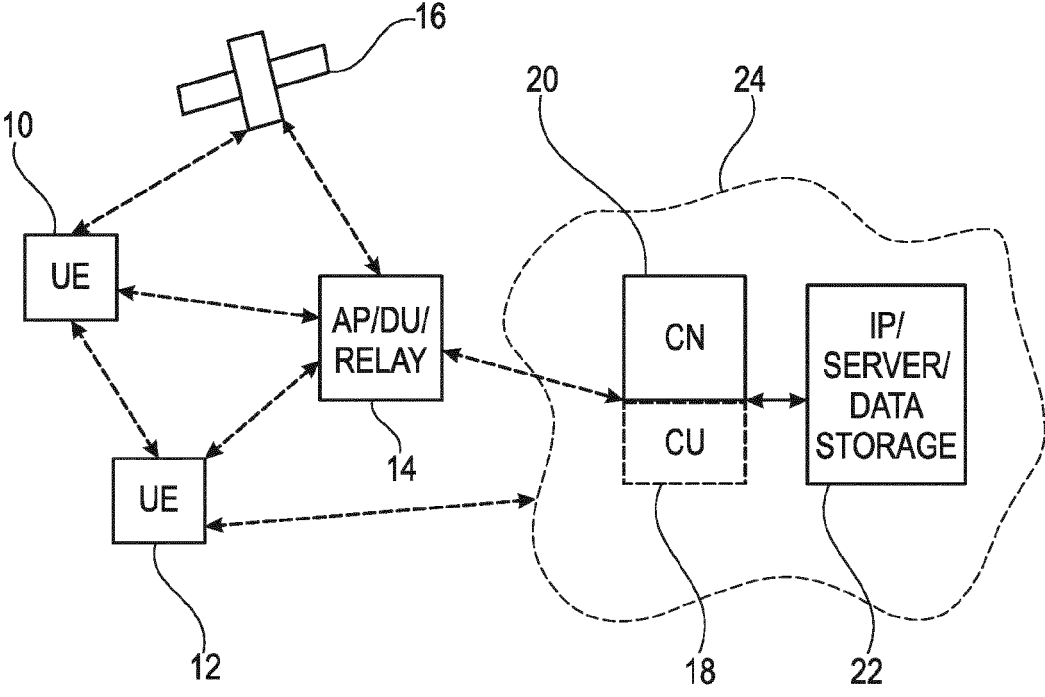
FIG. 1 illustrates a part of an exemplifying radio access network.

In the following description, for purposes of explanation and not limitation, specific details are set forth such as particular architectures, interfaces, techniques, etc., in order to provide a thorough understanding of the examples. However, it will be apparent to those skilled in the art that the disclosed subject matter may be practiced in other illustrative examples that depart from these specific details. In some instances, detailed descriptions of well-known devices and/ or methods are omitted so as not to obscure the description with unnecessary detail.

The communication system may, for example, be configured to use a time division duplex (TDD) technique for data transmission. The communication system may support one or more radio access technologies (RATs). A radio access technology of the radio access technologies may, for example, be evolved universal terrestrial radio access (E-UTRA) or 5G new radio (NR), but it is not limited to, as a person skilled in the art may apply the present subject matter to other communication systems provided with necessary properties. The term "node" as used herein may refer to a base station or a moving/mobile node.

The communication system comprises IAB donors and IAB nodes. An IAB donor may be defined as a node with a wired backhaul link, which provides the user equipment's interface to a core network of the communication system as well as a wireless backhauling functionality to IAB nodes. The IAB donor may, for example, be equipped with a centralized unit (CU) as well as a distributed unit (DU). The IAB node may be a node that supports wireless access to user equipments and wirelessly backhauls the access traffic. The IAB node is equipped with a distributed unit (DU) and a mobile termination (MT) unit. The DU and MT of the IAB node may be referred to as IAB-DU and IAB-MT respectively. The IAB node may provide a backhauling functionality and an access functionality using the IAB-DU and IAB-MT. The IAB node may operate as a parent node, when its IAB-DU is connected to other IAB nodes' MTs, and as a child node when its IAB-MT is connected to another IAB node's DU. The IAB-DU of a given IAB-node may be configured to exchange data over an access link with user equipments and the IAB-MT of the given IAB node may be configured to exchange data over a backhaul link with a DU of a IAB donor or with the IAB-DU of another IAB node.

Data transmission by the IAB node may be improved by using resource multiplexing, where the multiplexing may be based on spatial or frequency division of signals, e.g., spatial domain multiplexing (SDM) or frequency domain multiplexing (FDM) type. In particular, the resource multiplexing between the access and backhaul links of an IAB node may improve resource utilization. However, the multiplexing may require enhancements for control and usage of available radio resources of the IAB-MT and IAB-DU of the IAB node, because simultaneous usage of IAB-MT and IAB-DU resources may result in new interference scenarios that may have implications to crosslink interference (CLI) measurements and/or power control. The present subject matter may solve this issue by controlling, e.g., using an accuracy requirement, the alignment in timing of the IAB-MT transmission with IAB-DU transmission. This may avoid harmful cross-link interferences e.g., in cases where neighboring cells would have different UL-DL switch points.

In one example, the node may be configured to transmit first data on a backhaul link of the node and to transmit second data on an access link of the node. The backhaul link may refer, for example, to a communication link for transmitting data and/or receiving data between the node and another node such as IAB node or an IAB donor node. The access link may, for example, refer to a communication link for transmitting and/or receiving data between the node and a user equipment. The node may be operated by, for example, testing whether it can transmit the first data and second data simultaneously.

An apparatus such as a measurement equipment may be configured to receive said first data (D1) and said second data (D2) and determine transmit times of the first data and second data. The determined transmit times of the first data and second data may comprise one or more first transmit times of the first data and one or more second transmit times of the second data. For example, the first data and second data may comprise N first reference signals and N second reference signals respectively, where $N \geq 1$. In this case, the determined transmit times may comprise N first transmit times $$t_{D1}^1 \ldots t_{D1}^N$$

of the N first reference signals of the first data respectively and N second transmit times $$t_{D2}^1 \ldots t_{D2}^N$$

of the N second reference signals of the second data respectively. That is, the apparatus may determine 2×N transmit times from the received first data and second data. E.g., if the first data and second data each comprises one reference signal (i.e., N=1), the determined transmit times may comprise one first transmit time $$t_{D1}^1$$

of the first data and one second transmit time $$t_{D2}^1$$

of the second data.

The determined 2×N transmit times may be used by the apparatus to determine (e.g., compute) a timing error. The timing error may, for example, be determined using the time difference(s) between the N first transmit times of the first data and the corresponding N second transmit times of the second data. For example, in case the first data and second data comprise multiple reference signals (i.e., N>1), the time difference between each pair of corresponding reference signals of the first data and second data may be determined, resulting in N differences $$((|t_{D1}^1 - t_{D2}^1|, \ldots \text{ and } |t_{D1}^N - t_{D2}^N|).$$

The timing error may, for example, be the combination of the N time differences such as the average of the N time differences, $$\frac{(|t_{D1}^1 - t_{D2}^1| + \ldots + |t_{D1}^N - t_{D2}^N|)}{N}.$$

This may, for example, be the average frame timing difference between any two transmissions on IAB-DU and IAB-MT on different transmit antenna connectors or different physical antenna ports. In one example, the timing error may be measured as the timing difference between the different PDSCH and/or PUSCH demodulation reference signals (DM-RS) on different antenna ports belonging to different connectors or different beams on the carrier(s) from the representative connectors or beams under test.

The node may be configured to transmit the first data using first resources and to transmit the second data using second resources. The first resources may comprise a first set of one or more time slots. The second time resources may comprise a second set of one or more time slots. That is, the first data may be the content of the first set of time slots and the second data may be the content of the second set of time slots. The first set of time slots may, for example, form a first frame. The second set of time slots may, for example, form a second frame. Each time slot has a duration and a time slot number (e.g., from slot #0 to slot #7). For example, the first set of time slots may comprise N time slots for transmitting the N first reference signals of the first data respectively. The second set of time slots may comprise N time slots for transmitting the N second reference signals of the second data respectively. Each time slot of the first set of time slots and second time slots may comprise a total number m of time units e.g., the time unit may be a symbol. The first data may span m1 time units in each first time slot of the first set of time slots. The second data may span m2 time units in each second time slot of the second set of time slots. In one example, the number of time units m1 is equal to the number of time units m2. In another example, the number of time units m1 is different from the number of time units m2. In one example, the number of time units m1 is equal to the total number of time units m, i.e., m1=m and/or the number of time units m2 is equal to the total number of time units m, i.e., m2=m. The N first reference signals may be transmitted on one or more specific consecutive time units (named sb1) of the first set of time slots respectively. The N second reference signals may be transmitted on one or more specific consecutive specific time units sb2 of the second set of time slots respectively. The specific time unit(s) sb1 of the first reference signals may, for example, be the first and/or second symbols of the time slot. The specific time unit(s) sb2 of the second reference signals may, for example, be the third and/or fourth symbols of the time slot. Thus, the specific time units sb1 and sb2 may or may not have the same position within the time slot. If the time units sb1 and sb2 do not have the same position within the time slot, this may introduce a first time shift, herein referred to as Δt1, between the first data and second data. If for example, the time unit sb1 comprises the first and second symbols and the time unit sb2 comprises the third and fourth symbols, the first time shift may be computed between the corresponding symbols e.g. between the first symbol and the third symbol or between the second symbol and the fourth symbol.

The apparatus may be configured to process pairs of time slots of the first set of time slots and the second set of time slots. For example, the apparatus may process N pairs of the time slots of the first set of time slots and the second set of time slots. The pair of time slots may or may not have the same time slot number. If the pair of time slots do not have the same time slot number, this may introduce a second time shift, herein referred to as ΔT2=n×Δt2, where Δt2 is a time difference between two consecutive time slots (i.e., Δt2 is the duration or length of the time slot) and n is the difference between the time slot numbers of the pair of time slots. For example, each pair of the processed N pairs of the time slots may have the same second time shift ΔT2 e.g., the first processed pair of slots may be slot #1 and slot #3 and the second processed pair may have slot #2 and slot #4.

Hence, the overall time shift (referred to as time shift, Δt) may have one of the values: n×Δt2, Δt1+n×Δt2 or Δt1 depending on the pair of time slots being processed and depending on the position of the first reference signal and the second reference signal within the time slot (i.e., Δt=n×Δt2, Δt1+n×Δt2 or Δt1). The present subject matter may be advantageous as it may take into account this time shift for determining the timing error. In particular, the apparatus is configured to determine the time shift Δt between the first data and second data, and to shift one of the transmit times of the first data and second data. The difference between the shifted transmit time of one data of the first and second data and the unshifted transmit time of the other data of the first and second data may be the timing error. For example, the N first transmit times may be shifted as follows $$\text{shifted}_{t_{D1}^1} = |t_{D1}^1 - \Delta t| \ldots \text{shifted}_{t_{D1}^N} = |t_{D1}^N - \Delta t|,$$

and the timing error may be defined as follows:

$$\frac{(|\text{shifted\_t}_{D1}^1 - t_{D2}^1| + \ldots + |\text{shifted\_t}_{D1}^N - t_{D2}^N|)}{N},$$

$$\text{shifted}_{t_{D1}^1}$$

is the shifted transmit time obtained by shifting the first transmit time $$t_{D1}^1 \ldots \text{ and shifted}_{t_{D1}^N}$$

is the shifted transmit time obtained by shifting the first transmit time $$t_{D1}^N.$$

The present subject matter may be advantageous as it may seamlessly be integrated with existing defined resources. For example, the first data may be transmitted according to the Physical Uplink Shared Channel (PUSCH) type A or PUSCH type B, and the second data may be transmitted according to the Physical Downlink Shared Channel (PDSCH) type A or PDSCH type B.

Following the above annotations, in case the first data is transmitted on PUSCH type A and the second data is transmitted on PDSCH type A with one or more DM-RS symbols per slot, e.g., sb1 and sb2 are the third symbols within the time slot and m1=m2=m. In case the first data is transmitted on PUSCH type A with one or more DM-RS symbols per slot and the second data is transmitted on PDSCH type B with one or more DM-RS symbols per slot, sb1 is the third symbol and sb2 is the first symbol within the time slot and m1=m2=m. In case the first data is transmitted on PUSCH type B with one or more DM-RS symbols per slot and the second data is transmitted on PDSCH type A with one or more DM-RS symbols per slot, sb1 is the first symbol and sb2 is the third symbol within the time slot and m1=m2=m. In case the first data is transmitted on PUSCH type B with one or more DM-RS symbols per slot and the second data is transmitted on PDSCH type B with one or more DM-RS symbols per slot, sb1 and sb2 are the first symbols within the time slot and m1=m2=m.

The timing error determined by the apparatus may enable to test or control the operation of the node. The present method may thus enable to operate the node by testing it. For example, the timing error may be compared with a pre-defined limit. If the timing error does not exceed the limit, this indicates that the first data and second data are transmitted simultaneously according to the present subject matter e.g., that is the transmit times of the first data and second data are to be considered sufficiently well aligned to avoid negative impact to the network operation if the timing error is within a margin error which is said limit. In case the timing error exceeds the limit, the node may be reconfigured and the method may be repeated.

The method may, for example, be repeated until the node is able to transmit the first data and second data within the margin error. For example, this timing error requirement (e.g., not exceeding the limit) may be used independent of IAB-MT and IAB-DU RF configurations, e.g., whether they use the same antenna array or operate in FDM or SDM mode. This may ensure IAB nodes which pass the conformance testing will provide satisfactory performance in real-life deployment.

The present subject matter may further improve the operation e.g., testing of the node by enhancing the content of the of transmitted first data and second data so that the content of the first data and second data may be similar to the content of data transmitted during real-time operations of the nodes.

In one example, the first data and the second data may further comprise first user data and second user data respectively. For example, the first data may comprise N first user data in association with the N first reference signals respectively. The second data may comprise N second user data in association with the N second reference signals respectively.

In one first data generation example, the first user data and second user data are randomly generated. For example, the random generation is performed using a Pseudo-Noise (PN) sequence generator wherein the same sequence is used to generate both the first user data and second user data, e.g., the PN sequence generator may be the PN23 sequence generator. The same PN23 sequence may, for example, be used to generate both the IAB-DU PDSCH and IAB-MT PUSCH data content, where the PN23 sequence output bits may be separately mapped onto the IAB-DU PDSCH and IAB-MT PUSCH bits. Using the PN23 sequence generator to generate both the IAB-DU PDSCH and IAB-MT PUSCH data content may enable to randomize the data content for both the IAB-DU and IAB-MT transmission. If randomization is not used, the test measurements and results may be unintentionally impacted by the higher Peak-to-Average-Power-Ratio (PAPR) of the transmitted signals, caused by the correlation between signals, which may occur e.g., due to using same MAC padding bits for multiple carriers.

In one second data generation example, different cell IDs $$N_{ID}^{cell}$$

are used for the transmission of the first data and second data. Different $$N_{ID}^{cell}$$

are used for the IAB-DU and IAB-MT transmitted signals, so that different initialization $c_{init}$ may be used for the scrambling sequence generators for the IAB-DU PDSCH and IAB-MT PUSCH bits (as specified in clauses 6.3.1.1 and 7.3.1.1 of TS 38.211).

In one third data generation example, different terminal IDs $n_{RNTI}$ are used for the transmission of the first data and second data. Different $n_{RNTI}$ are used for the IAB-DU and IAB-MT transmitted signals, so that different initialization $c_{init}$ may be used for the scrambling sequence generators for the IAB-DU PDSCH and IAB-MT PUSCH bits (as specified in clauses 6.3.1.1 and 7.3.1.1 of TS 38.211).

To minimize the correlation between the IAB-DU and IAB-MT transmitted signals and/or between multiple IAB-MT or IAB-DU component carriers, at least one of the above first, second and third data generation examples may be applied in the present method.

FIG. 1 depicts example of simplified system architecture showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network. FIG. 1 shows devices 10 and 12. The devices 10 and 12 may, for example, be user devices. The devices 10 and 12 are configured to be in a wireless connection on one or more communication channels with a node 14. The node 14 is further connected to a core network

20. In one example, the node 14 may be an access node (such as (e/g)NodeB) 14 providing or serving devices in a cell. In one example, the node 14 may be a non-3GPP access node. The physical link from a device to a (e/g)NodeB is called uplink or reverse link and the physical link from the (e/g) NodeB to the device is called downlink or forward link. It should be appreciated that (e/g)NodeBs or their functionalities may be implemented by using any node, host, server or access point etc. entity suitable for such a usage. The node 14 may, in one example, be a IAB node comprising an IAB-DU and IAB-MT.

A communications system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 20 (CN or next generation core NGC). For example, the (e/g)NodeB may connect to an access and mobility management function (AMF) and user plane function (UPF) in the control plane and user plane, respectively. Depending on the system, the counterpart on the CN side can be a serving gateway (S-GW, routing and forwarding user data packets), packet data network gateway (P-GW), for providing connectivity of devices (UEs) to external packet data networks, or mobile management entity (MME), etc.

The device (also called user device, UE, user equipment, user terminal, terminal device, etc.) illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station.

The device typically refers to a device (e.g. a portable or non-portable computing device) that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IOT) network which is a scenario in which objects are provided with the ability to transfer data over a network without requiring human-to-human or human-to-computer interaction, e.g. to be used in smart power grids and connected vehicles. The device may also utilize cloud. In some applications, a device may comprise a user portable device with radio parts (such as a watch, earphones or eyeglasses) and the computation is carried out in the cloud. The device (or in some embodiments a layer 3 relay node) is configured to perform one or more of user equipment functionalities. The device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than an existing LTE system (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet as illustrated by the component referenced by numeral 22, or utilize services provided by them. The communication network may also be able to support the usage of cloud services, for example at least part of core network operations may be carried out as a cloud service (this is depicted in FIG. 1 by "cloud" 24). The communication system may also comprise a central control entity, or a like, providing facilities for networks of different operators to cooperate for example in spectrum sharing.

The technology of Edge cloud may be brought into a radio access network (RAN) by utilizing network function virtualization (NVF) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 14) and non-real time functions being carried out in a centralized manner (in a centralized unit, CU 18).

It should also be understood that the distribution of labour between core network operations and base station operations may differ from that of the LTE or even be non-existent. Some other technology advancements probably to be used are Big Data and all-IP, which may change the way networks are being constructed and managed. 5G is being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 16 in the mega-constellation may cover several satellite-enabled network entities that create on-ground cells. The on-ground cells may be created via an on-ground relay node 14 or by a gNB located on-ground or in a satellite.

It is understandable for a person skilled in the art that the depicted system is only an example of a part of a radio access system and in practice, the system may comprise a plurality of (e/g)NodeBs, the device may have an access to a plurality of radio cells and the system may comprise also other apparatuses, such as physical layer relay nodes or other network elements, etc. One of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figures 2, 3A, 3B:
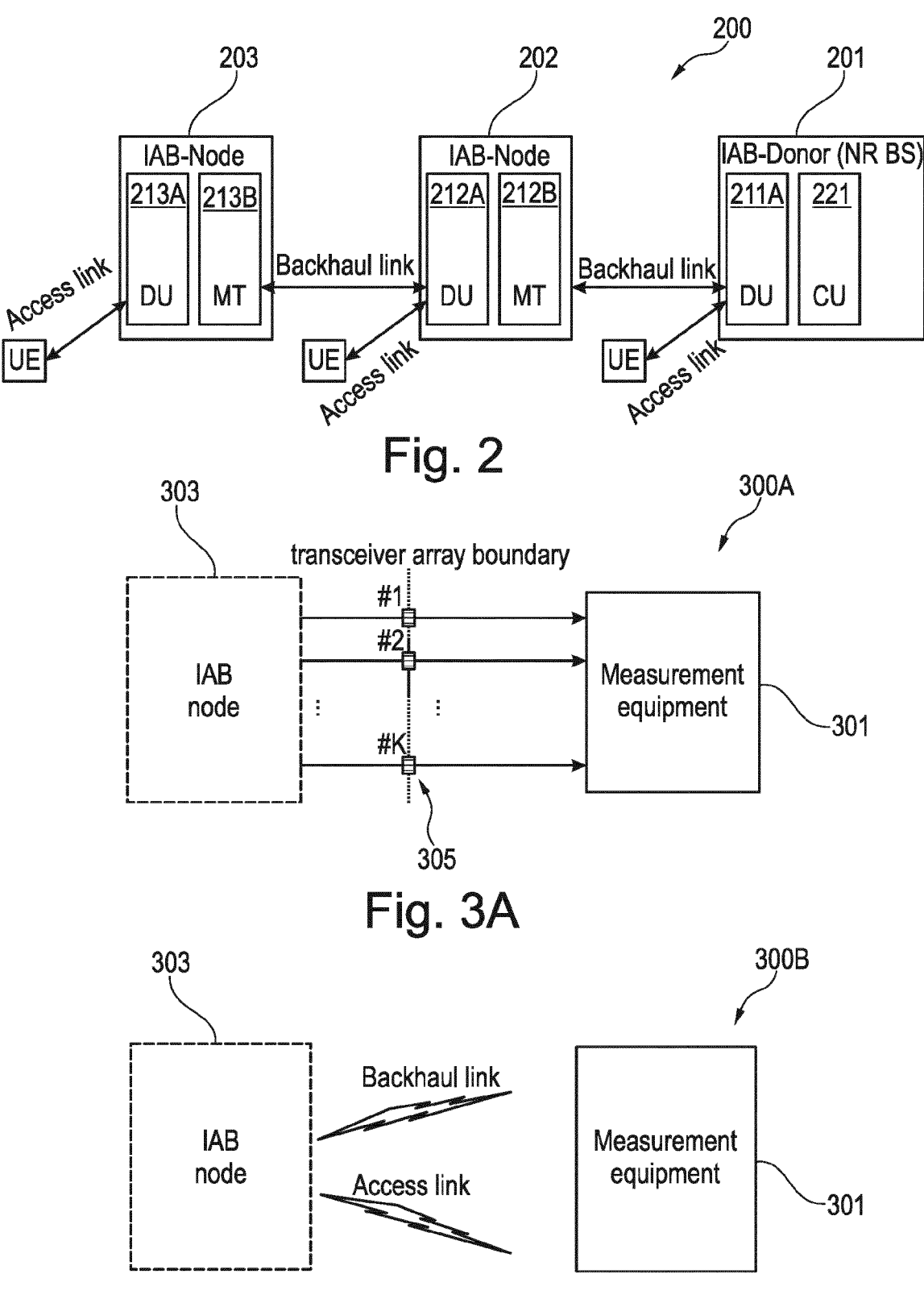
FIG. 2 is a schematic illustration of a communication system.
FIG. 3A is a schematic illustration of a testing system according to an example of the present subject matter.
FIG. 3B is a schematic illustration of a testing system according to an example of the present subject matter.

FIG. 2 is a schematic illustration of a wireless communication system 200. The communication system 200 may, for example, be configured to use a time division duplex (TDD) technique for data transmission.

Communication system 200 is shown to include a primary or IAB donor node 201 serving an IAB node 202 via a backhaul link, and the IAB node 202 then serving one or more UEs via an access link. The IAB donor 201 is equipped with a centralized unit (CU) 221 as well as a distributed unit (DU) 211A. The IAB node 202 is equipped with a DU 212A and a mobile termination (MT) unit 212B. The DU 212A and MT may be referred to as IAB-DU 212A and IAB-MT 212B respectively. The IAB node 202 may also have a backhaul interface with IAB-MT 213B of another IAB node 203. The IAB node 203 may serve one or more UEs via an access link. The IAB node 203 is further equipped with an IAB DU 213A. Each of the backhaul links and access links may be an air interface such as NR Uu interface. With this arrangement, data may, for example, pass in the downlink direction from the IAB donor node 201 to the IAB node 202 and in turn from the IAB node 202 to a served UE and to IAB node 203 etc., and data may likewise pass in the uplink direction from a served UE to the IAB node 202 and in turn to the IAB donor node. Communication system 200 is shown to include one IAB donor node and two IAB nodes, for simplicity, but it is not limited.

FIG. 3A is a schematic illustration of a testing system in accordance with an example of the present subject matter. The testing system 300A may comprise a node 303 such as IAB node 202 and 203 and a measurement equipment 301. The node 303 may be configured to transmit data through transmit antenna connectors 305 at a transceiver array boundary. The measurement equipment 301 may be configured to connect to the transmit antenna connectors 305 in order to receive data transmitted at the transmit antenna connectors 305.

FIG. 3B is a schematic illustration of an alternative testing system 300B in accordance with an example of the present subject matter. The testing system 300B may comprise node 303 such as IAB node 202 and 203 and measurement equipment 301. The measurement equipment 301 may be configured to receive/intercept data transmitted by the node 303 through the backhaul link and access link. The testing system 300B may enable a remote implementation to do radiated measurement using the measurement equipment 301.

FIG. 4 is a flowchart of a method for operating a node according to an example of the present subject matter. For the purpose of explanation, the method may be implemented in the system illustrated in previous FIGS. 3A-B, but is not limited to this implementation. Operating the node may for example comprise testing the node. The testing of the node may, for example, enable to determine whether the node can perform simultaneous transmissions on backhaul link and access link within margin errors.

First data D1 which is transmitted by the node 303 on the backhaul link may be received in step 401 by the measurement equipment 301. Second data D2 which is transmitted by the node 303 on the access link may be received in step 403 by the measurement equipment 301. The first data may, for example, be transmitted by the IAB-MT unit of the node 303 and the second data may, for example, be transmitted by the IAB-DU unit of the node 303.

The node 303 may be configured to transmit the first data using a first set of N time slots and transmit the second data using a second set of N time slots, where N≥1. The first set of time slots may comprise time slots for transmitting N first reference signals of the first data respectively. The second set of time slots may comprise time slots for transmitting N second reference signals of the second data respectively. For example, the positions of the first reference signal and the second reference signal within the time slot may be the same. This may, for example, be the case if the first data and second data are transmitted on the PUSCH type A and PDSCH type A respectively or if the first data and second data are transmitted on the PUSCH type B and PDSCH type B.

The measurement equipment 301 may determine in step 405 transmit times of the first data and second data using the received first data and second data. For that, the measurement equipment 301 may process pairs of time slots of the first set of time slots and the second set of time slots. For example, the measurement equipment 301 may process N pairs of the time slots of the first set of time slots and the second set of time slots. The pair of time slots may, for example, have the same time slot number. The transmit times may be determined by, for example, performing a transmit timing measurement on the first data and second data. The transmit timing measurement may, for example, be the timing of the measured signal in the Error-Vector-Magnitude (EVM) measurement described in TS 38.176-1 Annex H.4 and TS 38.176-2 Annex M.4.

The transmit times may comprise a single value $t_{D1}$ for the first data and a single value $t_{D2}$ for the second data e.g., in case a single pair of time slots is processed in step 405 (N=1). In another example, the transmit times may comprise N first transmit times $$(t_{D1}^1 \; \dots \; t_{D1}^N)$$

of the first data and N second transmit times $$(t_{D2}^1 \; \dots \; t_{D2}^N)$$

of the second data.

The measurement equipment 301 may determine in step 407 a timing error using the determined transmit times. The timing error may, for example, be the difference $|t_{D1}-t_{D2}|$ or the average $$\frac{(|t_{D1}^1 - t_{D2}^1| + \dots + |t_{D1}^N - t_{D2}^N|)}{N}.$$

FIG. 5 is a flowchart of a method for operating a node according to an example of the present subject matter. For the purpose of explanation, the method may be implemented in the system illustrated in previous FIGS. 3A-B, but is not limited to this implementation. Operating the node may for example comprise testing the node. The testing of the node may, for example, enable to determine whether the node can perform simultaneous transmissions on backhaul link and access link within margin errors.

First data D1 which is transmitted by the node 303 on the backhaul link may be received in step 501 by the measurement equipment 301. Second data D2 which is transmitted by the node 303 on the access link may be received in step 503 by the measurement equipment 301. The first data may, for example, be transmitted by the IAB-MT unit of the node 303 and the second data may, for example, be transmitted by the IAB-DU unit of the node 303.

The node 303 may be configured to transmit the first data using a first set of N time slots and transmit the second data using a second set of N time slots, where N≥1. The first set of time slots may comprise time slots for transmitting the N first reference signals of the first data respectively. The second set of time slots may comprise time slots for transmitting N second reference signals of the second data respectively. For example, the positions of the first reference signal and the second reference signal within the time slot may be different. This may, for example, be the case if the first data and second data are transmitted on the PUSCH type A and PDSCH type B respectively or if the first data and second data are transmitted on the PUSCH type B and PDSCH type A respectively.

The measurement equipment 301 may determine in step 505 transmit times of the first data and second data using the received first data and second data. For that, the measurement equipment 301 may process pairs of time slots of the first set of time slots and the second set of time slots. For example, the measurement equipment 301 may process N pairs of the time slots of the first set of time slots and the second set of time slots. The pair of time slots may, for example, have different time slot numbers. The transmit times may be determined by, for example, performing a transmit timing measurement on the first data and second data. The transmit timing measurement may, for example, be the timing of the measured signal in the EVM measurement described in TS 38.176-1 Annex H.4 and TS 38.176-2 Annex M.4.

The transmit times may comprise a single value $t_{D1}$ for the first data and a single value $t_{D2}$ for the second data e.g., in case a single pair of time slots is processed in step 505 (N=1). In another example, the transmit times may comprise N first transmit times $$(t_{D1}^1 \; \dots \; t_{D1}^N)$$

of the first data and N second transmit times $$(t_{D2}^1 \; \dots \; t_{D2}^N)$$

of the second data.

The measurement equipment 301 may determine in step 506 the time shift between the first data and the second data that is caused by the difference in the time slot numbers of the processed pairs and the difference in the positions of the reference signals within the time slot.

Since the first and second reference signals do not have the same position within the time slot, this may introduce a first time shift $\Delta t1$ between the first data and second data. Also, since the pairs of time slots do not have the same time slot number, this may introduce a second time shift $n \times \Delta t2$, where $\Delta t2$ is a time difference between two consecutive time slots (i.e., $\Delta t2$ is the duration or length of the time slot) and n is the difference between the time slot numbers of the pair of time slots. Hence, the time shift $\Delta t$ may have the value: $\Delta t1 + n \times \Delta t2$.

The measurement equipment 301 may determine in step 507 a timing error using the determined transmit times and the time shift $\Delta t$. For that, if N=1, one of the transmit times $t_{D1}$ and $t_{D2}$ may be shifted e.g., $t_{D2}$ may be shifted by $\Delta t$ to obtain a shifted transmit time shifted_$t_{D2}$=|$t_{D2}$−$\Delta t$| and the timing error may be the difference between the shifted transmit time shifted_$t_{D2}$ and the unshifted transmit time $t_{D1}$ e.g., the timing error may be |$t_{D1}$−shifted$_{t_{D2}}$|. If N>1, the N second transmit times may be shifted as follows $$\text{shifted}_{t_{D2}^1} = |t_{D2}^1 - \Delta t| \ldots \text{shifted}_{t_{D2}^N} = |t_{D2}^N - \Delta t|,$$

and the timing error may be defined as follows:

$$\frac{\left(|\text{shifted}\_t_{D2}^1 - t_{D1}^1| + \ldots + |\text{shifted}\_t_{D2}^N - t_{D1}^N|\right)}{N}.$$

In one example method, it may be checked whether the first and second reference signals do not have the same position and that the pairs of time slots do not have the same time slot number, and in case at least one of the two checks is successful step 506 may be performed; otherwise step 507 may be performed without using the time shift as described in step 407. The first check may be successful if it is determined that the first and second reference signals do not have the same position. The second check may be successful if it is determined that the pairs of time slots do not have the same time slot number.

Figure 6:
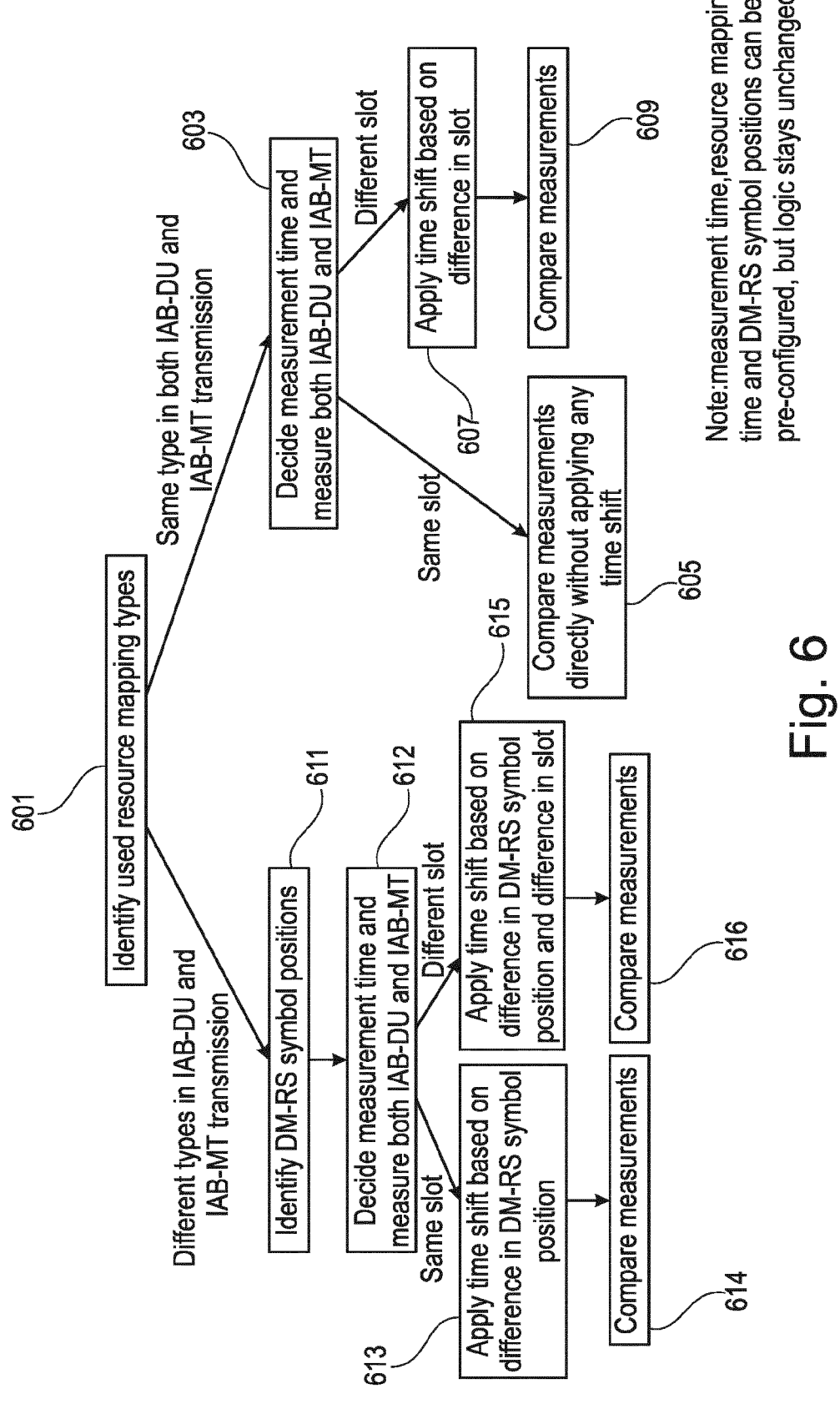
FIG. 6 is a flowchart of a method for operating a node according to an example of the present subject matter.

FIG. 6 is a flowchart of a method for operating a node according to an example of the present subject matter. For the purpose of explanation, the method may be implemented in the system illustrated in previous FIGS. 3A-B, but is not limited to this implementation.

In step 601, the measurement equipment 301 may identify resource mapping types which are used to transmit first data and second data by the node 303, wherein the first data and second data is received at the measurement equipment 301. The mapping type may, for example, be type A or type B for PDSCH and PUSCH. The first data may, for example, be transmitted by the IAB-MT unit of the node 303 and the second data may, for example, be transmitted by the IAB-DU unit of the node 303. If the same mapping types are used in IAB-DU and IAB-MT transmission, then steps 603 to 609 may be performed. If different mapping types are used in IAB-DU and IAB-MT transmission, then steps 611 to 616 may be performed.

In step 603, the measurement equipment 301 may decide measurement time and measure both IAB-DU related data and IAB-MT related data simultaneously, concurrently, or separately. In one example, and as indicated in FIG. 6, the measurement time may be pre-configured so that the measurement equipment 301 is instructed to do measurement in specific time. This step 603 may for example indicate which time slot numbers are involved in each pair of time slots of the IAB-DU and IAB-MT e.g., the measurement time decision may indicate the pair of time slots (slot #0 of IAB-DU, slot1 IAB-MT) (slot #1 of IAB-DU, slot #2 of IAB-MT) etc. may be processed. If the same time slot numbers are involved in the pairs of time slots, then the measurements may be compared in step 605 directly without applying any time shift. However, if different time slot numbers are involved in the pairs of the slots, then a second time shift $\Delta T2$ based on the difference in slot may be applied in step 607 and the measurements may be compared in step 609.

In step 611, the measurement equipment 301 may identify the DM-RS symbol positions in the time slots. In step 612, the measurement equipment 301 may decide measurement time and measure both IAB-DU related data and IAB-MT related data simultaneously, concurrently, or separately. If the same time slot numbers are involved, then only the first time shift $\Delta t1$ based on the difference in DM-RS symbol positions may be applied in step 613 and the measurements may be compared in step 614. If different time slot numbers are involved, then both the first time shift $\Delta t1$ based on the difference in DM-RS symbol positions and the second time shift $\Delta T2$ based on the difference in slot may be applied in step 615 and the measurements may be compared in step 616.

Figures 7A, 7B:
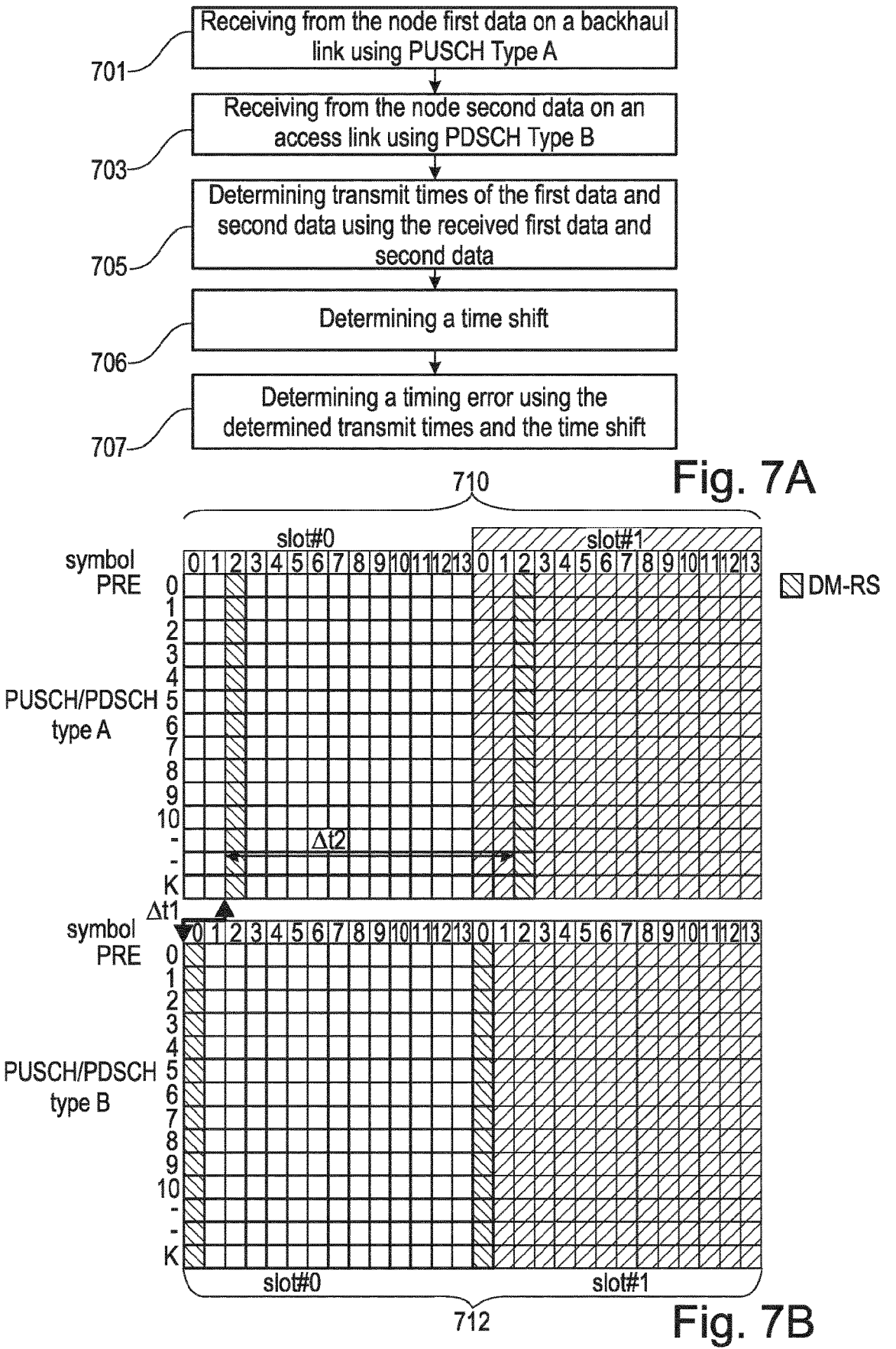
FIG. 7A is a flowchart of a method for operating a node according to an example of the present subject matter.
FIG. 7B provides a comparison of PDSCH and PUSCH mappings type A and B in a resource grid.

FIG. 7A is a flowchart of a method for operating a node according to an example of the present subject matter. For the purpose of explanation, the method may be implemented in the system illustrated in previous FIGS. 3A-B, but is not limited to this implementation.

First data which is transmitted by the node 303 on the backhaul link may be received in step 701 by the measurement equipment 301. Second data which is transmitted by the node 303 on the access link may be received in step 703 by the measurement equipment 301. In this example, the first data may be transmitted on PUSCH type A and the second data may be transmitted on the PDSCH type B. The first data may, for example, be transmitted by the IAB-MT unit of the node 303 and the second data may, for example, be transmitted by the IAB-DU unit of the node 303.

As indicated in FIG. 7B, the first data may be transmitted using a first set of time slots 710 have time slot numbers slot #0 and slot #1. The second data may be transmitted using a second set of time slots 712 have time slot numbers slot #0 and slot #1. Only two time slots are shown for simplification of the drawings but the slots may comprise more than two slots.

The measurement equipment 301 may determine in step 705 transmit times of the first data and second data using the received first data and second data. For that, the measurement equipment 301 may process pairs of time slots of the first set of time slots and the second set of time slots. For example, the measurement equipment 301 may process the pairs of time slots such as the pair of the time slots (slot #1, slot #0) of the first set of time slots 710 and the second set of time slots 712. The processed pair of time slots have different time slot numbers.

As indicated in FIG. 7B, the third symbol of each time slot of the first set of time slots 710 may be used to transmit the respective first reference signal which is a DM-RS signal in this example. That is, the position of each first reference signal is the third symbol in the respective time slot. However, with the second time slots 712, the first symbol of each time slot is used to transmit the respective DM-RS signal. That is, the position of each second reference signal is the first symbol in the respective time slot.

The measurement equipment 301 may determine the time shift 706 between the first data and second data. As indicated in FIG. 7B, the time shift involves a first time shift $\Delta t1$ and a second time shift $\Delta t2$. The first time shift $\Delta t1$ is the time difference between the symbol number 1 of slot #0 and the symbol number 3 of slot #0, i.e., $\Delta t1$ may be the duration of two symbols. The second time shift $\Delta t2$ may be the time difference between the time slot numbers slot #0 and slot #1 of the processed pair, i.e., $\Delta t2$ may be the duration of the time slot. The time shift in this example may be $\Delta t=\Delta t1+\Delta t2$.

The measurement equipment 301 may determine in step 707 a timing error using the determined transmit times and the time shift $\Delta t$. For example, the first transmit times of the first data may be shifted using the time shift $\Delta t$ and the timing error may be computed using the shifted first transmit times and the (unshifted) second transmit times of the second data.

The present subject matter may provide the following implementation examples. Currently, the base station (BS) Time-Alignment-Error (TAE) requirements are tested using PDSCH type A where the front-loaded DM-RS is located in symbol number 2 of the slot, while the UE TAE requirements are tested using PUSCH type B where the front-loaded DM-RS is located before the data symbols in the slot. The first implementation example according to the present subject matter may use PDSCH type A and PUSCH type A, where the front-loaded DM-RS is located in symbol number 2 of the slot, for the testing of the timing error requirement between IAB-DU and IAB-MT simultaneous transmission. This means that the DM-RS in the IAB-DU and IAB-MT may be transmitted at the same time instances. Therefore, the existing test equipment for BS carrier-aggregation (CA) and Multiple-input-multiple-output (MIMO) TAE measurements can be, respectively, reused for the timing error measurements between IAB-DU and IAB-MT simultaneous transmission in FDM and SDM operation modes. Note that the DM-RS timing measurements for the IAB-DU and IAB-MT transmission can be made at different time slots, and then be used to calculate the transmit timing of the DM-RS of a certain slot, which in turn be used to obtain the timing error between IAB-DU and IAB-MT simultaneous transmission. On the other hand, if PDSCH type A and PUSCH type B are used for the testing of the timing error requirement between IAB-DU and IAB-MT simultaneous transmission, then the DM-RS in the IAB-DU and IAB-MT will not be transmitted at the same time instances. Therefore, the measured timing difference between the DM-RS in the IAB-DU and IAB-MT transmission cannot be directly used to verify the timing error requirement. One second implementation example may be to measure the timing error as the time difference between the transmit timing of a certain symbol number (e.g., symbol number 0) in the slot in the IAB-DU transmission and the transmit timing of this certain symbol number in the slot in the IAB-MT transmission. The test equipment e.g., 301, may calculate the transmit timing of this certain symbol number in the slots using the measured transmit timing of DM-RS in the slots. This means that the DM-RS timing measurements for the IAB-DU and IAB-MT transmission can be made at different time instances, and then be used to calculate the transmit timing of this certain symbol number in the slots, which in turn be used to obtain the timing error between IAB-DU and IAB-MT simultaneous transmission. Illustration of PDSCH and PUSCH type A and type B resource mapping and there relevant timings are shown in FIG. 7B. The length of a single symbol in time (one square in horizontal dimension) is known from the physical layer selection of sub-carrier spacing. Similarly, the length of a slot is known from physical layer parameters, e.g., the NR physical layer parameters related to symbol length. This means that ideal time difference between DM-RS symbols ($\Delta t1$ in FIG. 7B) can be calculated based on physical layer parameters. Ideal time $\Delta t1$ equals to M*symbol length, where M is the number of symbols between the DM-RS symbol positions. Similarly, time difference between repetitions of DM-RS in same symbol number ($\Delta t2$ in FIG. 7B) is known to be equal to slot length. Therefore, a time shift corresponding to ideal time shift can be applied to the signal, after which the timing between DM-RS symbols may be compared, resulting in the timing error between signals. The possibility for time shift applies both when measurements are taking in the same slot or in different slots. The applicable time shift between the same mapping type is n*$\Delta t2$, i.e., n times slot length, where n is the number of slots between measurements. The applicable time shift between the different mapping types is n*$\Delta t2$+$\Delta t1$, i.e., n times slot length+M times symbol length, where n is the number of slots between measurements and M is the number of symbols between DM-RS symbol positions. The same concept can be applied also in case there are multiple DM-RS symbols in a slot, as comparison may always be between two DM-RS symbols and the shift is calculated based on the position of the symbol. In one third implementation example, PN23 may be used to generate both the IAB-DU PDSCH and IAB-MT PUSCH data content to randomize the data content for both the IAB-DU and IAB-MT transmission. Indeed, the BS TAE requirements may be tested using PN23 (pseudorandom data sequence) to generate the PDSCH data content, while the UE TAE requirements may be tested using MAC padding bits for the PUSCH data content.

To minimize the correlation between the IAB-DU and IAB-MT transmitted signals and/or between multiple IAB-MT or IAB-DU component carriers, at least one of the following options a) to c) may be applied in the tests: a) The same PN23 sequence is used to generate both the IAB-DU PDSCH and IAB-MT PUSCH data content, where the PN23 sequence output bits will be separately mapped onto the IAB-DU PDSCH and IAB-MT PUSCH bits. b) Different $$N_{ID}^{cell}$$

are used for the IAB-DU and IAB-MT transmitted signals, so that different initialization $c_{init}$ may be used for the scrambling sequence generators for the IAB-DU PDSCH and IAB-MT PUSCH bits (as specified in clauses 6.3.1.1 and 7.3.1.1 of TS 38.211) and c) Different $n_{RNTI}$ are used for the IAB-DU and IAB-MT transmitted signals, so that different initialization $c_{init}$ may be used for the scrambling sequence generators for the IAB-DU PDSCH and IAB-MT PUSCH bits (as specified in clauses 6.3.1.1 and 7.3.1.1 of TS 38.211).

FIG. 8A is a table 801 indicating mapping type A for PDSCH for IAB-DU according to an example of the present subject matter. The parameters of the table 810 may, for example, be used to test specs 38.176-1 and 38.176-2 as common physical channel parameters.

The three parameters 802 of the first three rows of the table 801 may be improved according to the present subject matter by adding additional parameter values which are indicated in bold characters. For example, additional values of the positions of the DM-RS symbols are provided in the table 801 and a new value (e.g., type B) of the mapping type.

FIG. 8B is a table 810 indicating mapping types A and B for PUSCH for IAB-MT according to an example of the present subject matter. The parameters of the table 810 may, for example, be used to test specs 38.176-1 and 38.176-2 as common physical channel parameters.

The two parameters 811 of the first two rows of the table 810 may be improved according to the present subject matter by adding additional parameters values which are indicated in bold characters. For example, additional values of the positions of the DM-RS symbols are provided in the table 810 and a new value (e.g., type B) of the mapping type.

The tables of FIGS. 8A-B may be advantageously used. For example, test models for timing error between IAB-DU and IAB-MT requirement test may be enabled by said tables in TS 38.176-1 specification for conducted transmitter characteristics and in TS 38.176-2 for radiated transmitter characteristics.

FIG. 8C is a table 820 indicating PUSCH PRBs mapping of users for FR1 test models (frequency range 1) according to an example of the present subject matter. The parameters of the table 810 may, for example, be used to test specs 38.176-1 and 38.176-2. The table of FIG. 8C may enable to perform randomization for transmissions on PUSCH or PDSCH. For example, for each IAB-TM, PRBs may be mapped to user ($n_{RNTI}$) as shown in the table 820 of FIG. 8C.

An example implementation of the data randomization may be provided as follows. For example, for initialization of the scrambler and RE-mappers as defined in TS 38.211 the following additional parameters may be used: For IAB-DU, $$N_{ID}^{cell} = 1$$

for the lowest configured carrier, $$N_{ID}^{cell} = 2$$

for the $2^{nd}$ lowest configured carrier, . . . , $$N_{ID}^{cell} = n$$

for the $n^{th}$ configured carrier. And for IAB-MT, $$N_{ID}^{cell} = n + 1$$

for the lowest configured carrier, $$N_{ID}^{cell} = n + 2$$

for the $2^{nd}$ lowest configured carrier, . . . , $$N_{ID}^{cell} = 2n$$

for the $n^{th}$ configured carrier. The required amount of bits may be generated from the output of the PN23 sequence generator.

For example, an example requirement that may apply to IAB-DU DL and IAB-MT UL simultaneous transmission may be defined as follows. The timing error between IAB-DU and IAB-MT may be specified for a specific set of simultaneous signals/transmitter configuration/transmission mode. For example, for IAB-DU type 1-H and IAB-MT type 1-H, the timing error may be defined as the largest timing difference between any two signals belonging to TAB connectors belonging to IAB-DU and IAB-MT at the transceiver array boundary, where transmitter groups are associated with the TAB connectors in the transceiver unit array for a specific set of signals/transmitter configuration/transmission mode.

In one example, the following steps may be included in the procedure for testing IAB-DU DL and IAB-MT UL simultaneous transmissions: setting the connectors under test to transmit IAB-DU-FR1-TM1.1 or IAB-MT-FR1-TM1.1 and measuring the timing error between IAB-DU and IAB-MT as timing difference between DM-RS symbols after possible difference in DM-RS symbol position and slot number have been compensated for on different antenna ports belonging to different connectors on the carrier(s) from the representative connectors under test. 2).

In one example, the following steps may be included in the procedure for testing IAB-DU DL and IAB-MT UL simultaneous transmissions: setting the IAB type 1-O to transmit IAB-DU-FR1-TM1.1 or IAB-MT-FR1-TM1.1. using the configuration with the minimum number of cells and reference signals, setting the IAB type 2-O to transmit IAB-DU-FR2-TM 1.1 or IAB-MT-FR1-TM1.1 using the configuration with the minimum number of cells and reference signals, and measuring the timing error between IAB-DU and IAB-MT DU and IAB-MT as timing difference between DM-RS symbols after possible difference in DM-RS symbol position and slot number have been compensated for.

In FIG. 9, a block circuit diagram illustrating a configuration of an apparatus 1070 is shown, which is configured to implement at least part of the present subject matter. It is to be noted that the apparatus 1070 shown in FIG. 9 may comprise several further elements or functions besides those described herein below, which are omitted herein for the sake of simplicity as they are not essential for the understanding. Furthermore, the apparatus may be also another device having a similar function, such as a chipset, a chip, a module etc., which can also be part of an apparatus or attached as a separate element to the apparatus 1070, or the like. The apparatus 1070 may comprise a processing function or processor 1071, such as a central processing unit (CPU) or the like, which executes instructions given by programs or the like related to a flow control mechanism. The processor 1071 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 1072 denotes transceiver or input/output (I/O) units (interfaces) connected to the processor 1071. The I/O units 1072 may be used for communicating with one or more other network elements, entities, terminals or the like. The I/O units 1072 may be a combined unit comprising communication equipment towards several network elements or may comprise a distributed structure with a plurality of different interfaces for different network elements. Reference sign 1073 denotes a memory usable, for example, for storing data and programs to be executed by the processor 1071 and/or as a working storage of the processor 1071.

The processor 1071 is configured to execute processing related to the above described subject matter. In particular, the apparatus 1070 may be configured to perform at least part of the method as described in connection with FIG. 4, FIG. 5, FIG. 6 or FIG. 7A.

For example, the processor 1071 is configured for: receiving from a node first data on a backhaul link and second data on an access link, determining transmit times of the first and second data using the received first data and second data, determining a timing error using the determined transmit times.

As will be appreciated by person skilled in art, aspects of the present invention may be embodied as an apparatus, method, computer program or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon. A computer program comprises the computer executable code or "program instructions".

Any combination of one or more computer readable medium(s) may be utilized. The computer readable medium may be a computer readable storage medium. A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device.

'Computer memory' or 'memory' is an example of a computer-readable storage medium. Computer memory is any memory which is directly accessible to a processor. 'Computer storage' or 'storage' is a further example of a computer-readable storage medium. Computer storage is any non-volatile computer-readable storage medium. In some example embodiments computer storage may also be computer memory or vice versa.

A 'processor' as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object oriented programming language such as Java, Smalltalk, C++ or the like and conventional procedural programming languages, such as the "C" programming language or similar programming languages and compiled into machine executable instructions. In some instances the computer executable code may be in the form of a high level language or in a pre-compiled form and be used in conjunction with an interpreter which generates the machine executable instructions on the fly.

Generally, the program instructions can be executed on one processor or on several processors. In the case of multiple processors, they can be distributed over several different entities. Each processor could execute a portion of the instructions intended for that entity. Thus, when referring to a system or process involving multiple entities, the computer program or program instructions are understood to be adapted to be executed by a processor associated or related to the respective entity.

The invention claimed is:

1. An apparatus comprising: at least one processor; and at least one memory storing instructions that, when executed by the at least one processor, cause the apparatus at least to perform:

receiving from a node first data on a backhaul link;

receiving from the node second data on an access link;

determining transmit times of the first data and second data using the received first data and second data; and determining a timing error using the determined transmit times.

2. The apparatus of claim 1, wherein the first data comprising a first reference signal and the second data comprising a second reference signal, wherein the first reference signal and second reference signal are transmitted on a first time unit of a first time slot and a second time unit of a second time slot respectively, wherein determining the transmit times comprises: determining a time shift between the first time unit and the second time unit; and shifting the transmit time of the first data or of the second data using the time shift resulting in one shifted transmit time of one data of the first and second data and one unshifted transmit time of the other data of the first and second data, wherein the timing error is determined using the shifted transmit time and the unshifted transmit time.

3. The apparatus of claim 1, wherein the first data comprising multiple first reference signals and the second data comprising multiple second reference signals, the transmit times comprising multiple first transmit times of the first reference signals respectively and multiple second transmit times of the second reference signals respectively, wherein the apparatus is further caused to perform: determining individual timing errors between received pairs of first and second reference signals; and using the individual timing errors for determining the timing error.

4. The apparatus of claim 2, wherein the first reference signal spans a first number of time units within the first time slot, wherein the second reference signal spans a second number of time units within the second time slot, wherein the first number is the same or different from the second number.

5. The apparatus of claim 4, wherein the time shift being a time difference between a time unit of the first reference signal and the corresponding time unit of the second reference signal.

6. The apparatus of claim 2, wherein each of the first and second reference signal being a demodulation reference signal (DM-RS), wherein the first data is transmitted according to the Physical Uplink Shared Channel (PUSCH) type A or PUSCH type B, wherein the second data is transmitted according to the Physical Downlink Shared Channel (PDSCH) type A or PDSCH type B.

7. The apparatus of claim 1, wherein the first data and the second data comprise first user data and second user data respectively, wherein the first user data and second user data are randomly generated.

8. The apparatus of claim 7, wherein the random generation is performed utilizing a Pseudo-Noise (PN) sequence generator wherein the same sequence is used to generate both the first user data and second user data.

9. The apparatus of claim 1, wherein different cell IDs are used for the transmission of the first data and second data.

10. The apparatus of claim 1, wherein different terminal IDs are used for the transmission of the first data and second data.

11. The apparatus of claim 1, wherein the apparatus is further caused to perform: determining whether the timing error exceeds a predefined limit.

12. The apparatus of claim 1, wherein the first data and second data being simultaneously transmitted.

13. The apparatus of claim 1, wherein determining the transmit times comprises performing a first transmit timing measurement of the first data and a second transmit timing measurement of the second data and comparing the first and second transmit timing measurements.

14. A method, comprising:

receiving from a node first data on a backhaul link;

receiving from the node second data on an access link;

determining transmit times of the first data and second data using the received first data and second data; and determining a timing error using the determined transmit times.

15. The method of claim 14, the first data comprising a first reference signal and the second data comprising a second reference signal, wherein the first reference signal and second reference signal are transmitted on a first time unit of a first time slot and a second time unit of a second time slot respectively, wherein determining the transmit times comprises: determining a time shift between the first time unit and the second time unit; and shifting the transmit time of the first data or of the second data using the time shift resulting in one shifted transmit time of one data of the first and second data and one unshifted transmit time of the other data of the first and second data, wherein the timing error is determined using the shifted transmit time and the unshifted transmit time.

16. The method of claim 14, wherein the first data comprising multiple first reference signals and the second data comprising multiple second reference signals, the transmit times comprising multiple first transmit times of the first reference signals respectively and multiple second transmit times of the second reference signals respectively, the method further comprising: determining individual timing errors between received pairs of first and second reference signals; and using the individual timing errors for determining the timing error.

17. The method of claim 15, wherein the first reference signal spans a first number of time units within the first time slot, wherein the second reference signal spans a second number of time units within the second time slot, wherein the first number is the same or different from the second number.

18. The method of claim 17, wherein the time shift being a time difference between a time unit of the first reference signal and the corresponding time unit of the second reference signal.

19. The method of claim 14, wherein determining the transmit times comprises performing a first transmit timing measurement of the first data and a second transmit timing measurement of the second data and comparing the first and second transmit timing measurements.

20. A non-transitory computer program product comprising instructions for causing an apparatus for performing at least the following:

receiving from a node first data on a backhaul link and second data on an access link;

determining transmit times of the first and second data using the received first data and second data; and determining a timing error using the determined transmit times.

* * * * *